(12) United States Patent
Lin (10) Patent No.: US 6,567,438 B2
(45) Date of Patent: May 20, 2003

(54) ACTIVE AND LOW-POWER LASER STABILIZATION

(75) Inventor: Hong Lin, Palo Alto, CA (US)

(73) Assignee: Calmar Optcom, Inc., Sunnyvale, CA (US)

(*) Notice: Subject to any disclaimer, the term of this patent is extended or adjusted under 35 U.S.C. 154(b) by 0 days.

(21) Appl. No.: 09/908,438

(22) Filed: Jul. 17, 2001

(65) Prior Publication Data

US 2002/0071453 A1 Jun. 13, 2002

Related U.S. Application Data (60) Provisional application No. 60/245,869, filed on Nov. 3, 2000, and provisional application No. 60/218,632, filed on Jul. 17, 2000.

(51) Int. Cl.[7] .................................................. H01S 3/04
(52) U.S. Cl. ............................. 372/34; 372/94; 372/18; 372/6; 359/337
(58) Field of Search ........................... 372/92, 94, 97, 372/29.02, 29.022, 33, 29.01–34

(56) References Cited

U.S. PATENT DOCUMENTS

| | | | | |
|---|---|---|---|---|
| 1,813 A | * | 10/1840 | Kersey | .................... 241/97 |
| 1,926 A | * | 1/1841 | Carruthers et al. | ........... 432/97 |
| 5,042,898 A | | 8/1991 | Morey et al. | |
| 5,229,575 A | * | 7/1993 | Waller et al. | ................ 219/221 |
| 5,274,659 A | | 12/1993 | Harvey et al. | |
| 5,573,860 A | * | 11/1996 | Hirano et al. | ................ 428/616 |
| 5,574,739 A | | 11/1996 | Carruthers et al. | |
| 5,590,142 A | * | 12/1996 | Shan | ........................... 372/18 |
| 5,889,803 A | * | 3/1999 | Pfeiffer et al. | ................ 372/12 |
| 6,114,671 A | * | 9/2000 | Wehner et al. | .............. 219/483 |
| 6,147,795 A | * | 11/2000 | Derbyshire et al. | ......... 359/177 |
| 6,313,941 B1 | * | 11/2001 | Suzuki et al. | ................ 359/161 |
| 6,373,867 B1 | * | 4/2002 | Lin et al. | ....................... 372/18 |
| 6,389,046 B1 | * | 5/2002 | Stayt, Jr. et al. | ............. 356/450 |

FOREIGN PATENT DOCUMENTS

EP  0723320  7/1996

OTHER PUBLICATIONS

Thomas F. Carruthers et al., *A Dispersion—Managed, Harmonically Mode—Locked Fiber Laser*, 1999.

* cited by examiner

*Primary Examiner*—Paul Ip
*Assistant Examiner*—Tuan Nguyen
(74) *Attorney, Agent, or Firm*—Fish & Richardson P.C.

(57) ABSTRACT

Designs and techniques for actively stabilizing optical cavities in devices such as fiber lasers with reduced power consumption in the active control.

16 Claims, 8 Drawing Sheets

ACTIVE AND LOW-POWER LASER STABILIZATION

This application claims the benefits of U.S. Provisional Application No. 60/218,632 entitled "Highly Stable Actively Mode-Locked Fiber Laser" filed on Jul. 17, 2000, and No. 60/245,869 entitled "Actively Mode-Locked Fiber Laser with Active Cavity Control with Low Power Consumption" and filed on Nov. 3, 2000.

BACKGROUND

This application relates to lasers and laser stabilization.

A laser's main component is its optical cavity that encloses a laser gain medium. The simplest optical cavity includes two reflectors to reflect light between them. The laser cavity performs a number of functions in laser oscillation. For example, the laser cavity provides an optical feedback mechanism to bounce light back and forth multiple times through the laser gain medium for optical amplification. The laser cavity also selects one or more proper lasing frequencies within the gain spectral profile of the laser gain medium by requiring each selected frequency of light to be in resonance with the laser cavity. As a further example, the laser cavity operates to confine the light rays of the laser approximately along the optic axis of the laser cavity by filtering out light rays in other directions. As a result, the geometry of the laser cavity affects various characteristics of the laser.

The geometry of the laser cavity, however, may change with respect to many factors, such as environmental conditions (e.g., temperature or vibrations) and its own aging process. One notorious factor is a change in the cavity length due to the thermal expansion. Since a change in the laser cavity is time dependent, it is therefore desirable to provide an active control mechanism to stabilize the laser cavity by dynamically adjusting the cavity.

DETAILED DESCRIPTION

The techniques and devices of this application are in part based on the recognition that it is desirable for the active control mechanism to provide both a slow control mechanism to correct slow changes in the cavity geometry, e.g., caused by the temperature drift, and a fast control mechanism to correct sudden changes in the cavity geometry, e.g., caused by vibrations or certain processes in the gain medium. The slow control mechanism may also be used to bias the optical cavity so that the operating point of the fast control mechanism is set within the operating range to allow for control in both directions.

The slow control mechanism may be implemented by enclosing at least a portion of the laser cavity within a thermally-controlled chamber so that the temperature of this portion of the laser cavity is kept at a constant as the surrounding temperature changes by either heating up the chamber or extracting heat from the chamber. The chamber may be formed of a thermal insulating material to insulate the enclosed portion from the environment. One or more temperature sensors may be used within the thermally-controlled chamber to measure and monitor the temperature of the laser cavity. Two or more such sensors may be used to increase the accuracy in determining the average temperature of the enclosed portion of the optical cavity. The temperature control controls the optical path length of the enclosed portion of the optical cavity by controlling both the refractive index and the physical length. When the enclosed portion is a fiber segment, the change in the optical path length caused by the temperature-induced index change may be greater than that caused by the temperature-induced changed in the physical length.

The fast cavity control mechanism may be implemented by using a piezo-electric transducer to adjust the physical length of the laser cavity in response to a control signal. The piezo-controlled portion of the laser cavity may be enclosed in the thermally-controlled chamber. Alternatively, this portion may be placed outside the chamber. In another implementation, the fast control mechanism may also be a thermal control over a small section of the optical cavity located outside the thermally-controlled chamber.

The techniques and devices of this application are also based on the recognition that the power consumption of the active control mechanism should consume as less power as possible to meet the requirements of various applications. The thermally-controlled chamber is generally kept at a temperature above the environmental temperature by heating the chamber. Therefore, it takes more power to control the temperature of the entire laser cavity than to control the temperature of only a portion of the laser cavity. Hence, one or more selected thermal-sensitive portions of the laser cavity may be enclosed in the thermal control chamber while the remaining portions of the laser cavity may be left outside the chamber. The variation in these remaining portions of the laser cavity may be compensated for by the fast control mechanism.

Furthermore, since the active control mechanism consumes power in controlling the laser cavity, the total amount of the control over the laser cavity may be partitioned into a passively controlled part and an actively controlled part.

The actively controlled part is coupled to and is controlled by the active control mechanism. The passively controlled part, in contrast, is coupled to a passive control unit that does not require a power supply and hence does not consume power. This passive control unit is specially designed to change the dimension of the passively controlled part to negate a change caused the environment temperature. In one embodiment, the passive control unit includes different parts that are formed of materials with different coefficients of thermal expansion. These different parts are engaged to one another and are coupled to the passively controlled part to reduce the optical path length of the laser cavity as the temperature rises and to increase the optical path length as the temperature decreases. In general, this passive control mechanism may be used to perform a portion of the compensation by the active thermal control in the thermally-controlled chamber as part of the slow control mechanism.

The above control mechanisms, other associated techniques of this application, and their combinations may be generally applicable to many types of lasers, including lasers with ring cavities and non-ring cavities (e.g., Fabry-Perot cavities), lasers in either CW operations or pulsed operations, and lasers with fibers as the gain media or other forms of materials as gain media (e.g., gases, liquids, and solids such as crystals). The following describes embodiments and exemplary implementations of the above control mechanisms in fiber lasers, and more specifically in mode-locked fiber lasers. The representative parameter for the geometry of the laser cavity in such fiber ring lasers is the total fiber ring length. The total fiber ring length is controlled and adjusted to stabilize the laser oscillation against fluctuations.

Mode locking may be achieved by either active mode locking or passive mode locking. In active mode locking, either the amplitude or the phase of the intracavity optical field is modulated at a frequency equal to one or a multiplicity of the mode spacing. In passive mode locking, at least one nonlinear optical element is placed inside the laser cavity to produce an intensity-dependent response to an optical pulse so that the pulse width of the optical pulse exiting the nonlinear element is reduced. The following description use actively mode-locked fiber lasers to illustrate the techniques and designs.

Figure 1:
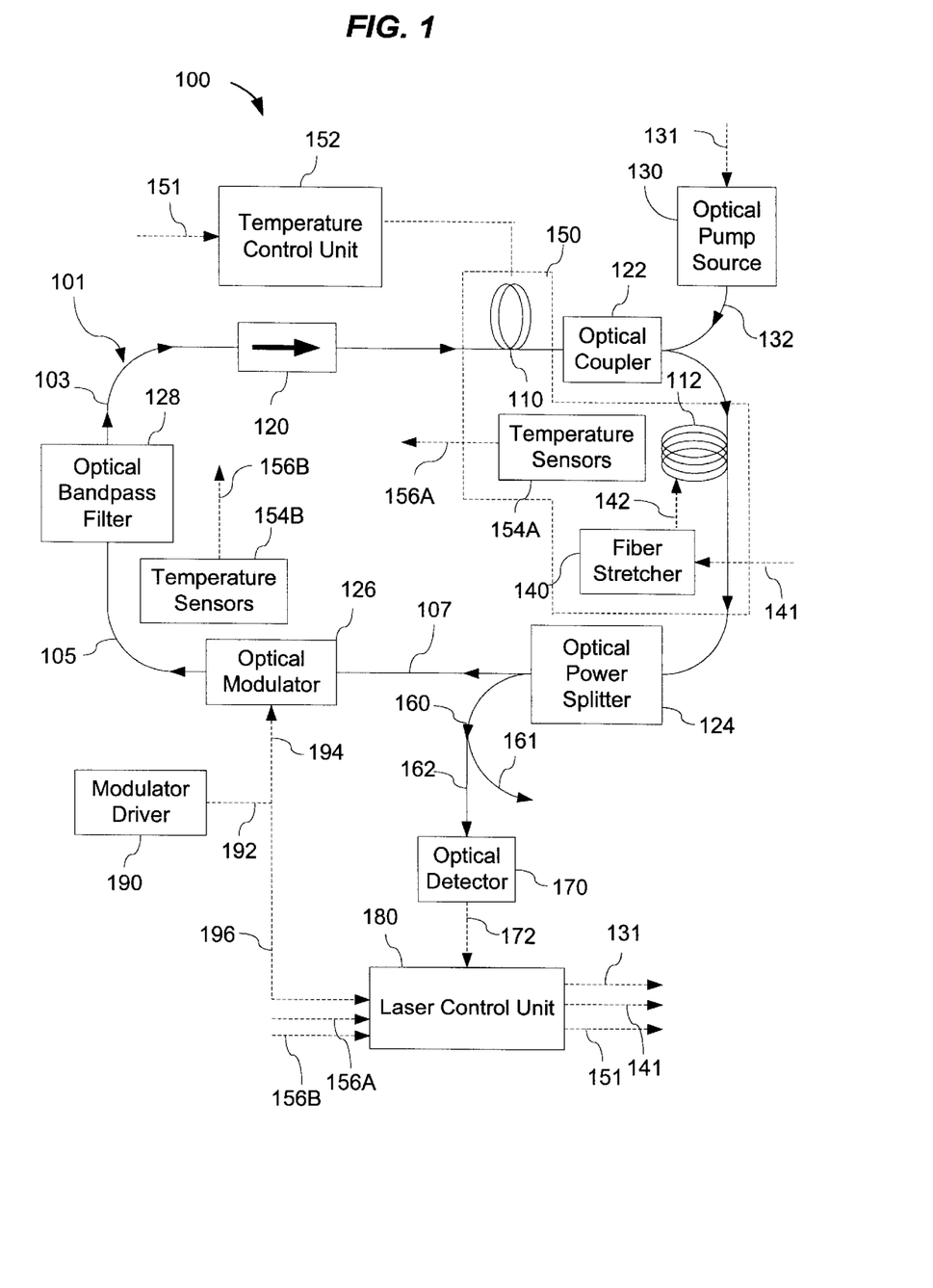
FIG. 1 shows an actively mode-locked fiber ring laser that implements stabilization mechanisms according to one embodiment, where solid arrowed lines represent optical paths and dashed arrowed lines represent the non-optical signal paths.

FIG. 1 shows one embodiment of an actively mode-locked fiber laser 100 that uses fiber segments 110, 112, 103, 105, and 107 to form a closed fiber ring or loop 101. This fiber ring 101 constitutes the laser cavity. Polarization-maintaining single-mode ("PM") fibers or polarizing single-mode fibers may be used in the fiber ring 101 to make it polarization maintaining. A PM fiber is configured to have well-defined principal axes for two mutually orthogonal polarizations. A polarizing fiber has a single principal polarization axis. These two types of fibers can be configured so that a principal axis is essentially not influenced by environmental conditions, such as fiber position, temperature, and stress. Therefore, the polarization of a beam propagating in such a fiber can be maintained. In the following description, "polarization-maintaining fiber" fiber will be used to include any fiber or optical waveguide that can preserve an optical polarization of a beam.

The fiber segment 110 is doped with active ions to produce the desired optical gain for the laser oscillation when optically pumped by light at a pump wavelength generally shorter than the lasing wavelength. When the optical gain in the segment 110 exceeds the total optical loss in the entire ring 101, laser oscillation can be generated. Many different dopants can be used to achieve laser oscillations at different wavelengths. For example, atomic transitions in rare-earth ions, such as erbium, holmium, neodymium, samarium, thulium and ytterbium, can be used to produce lasers from visible wavelengths to far infrared wavelengths (e.g., from 0.45 to about 3.5 microns). Er-doped fiber lasers for producing optical pulses at 1.55 micron are particularly useful for optical fiber communication since the optical loss in the commonly used silica fibers is minimum at about 1.55 micron under optical pumping at 980 nm or 1480 nm. Two or more different rare-earth ions can be mixed together to achieve certain pump and laser wavelengths that may not be readily available from a single doping element.

An optical pump source 130 (e.g., a laser) is provided to generate the desired pump light 132 at a proper pump wavelength. The pump source 130 may operate in response to an electrical driving signal 131 as in a diode-based pump source where the signal 131 is the driving current to the diode or diodes. An optical coupler 122 such as a fiber coupler is coupled in the fiber ring 101 adjacent to the fiber gain segment 110 to couple the pump light 132 into the gain segment 110. The optical coupler 122 is wavelength selective to couple only light at the pump wavelength and does not couple light at the laser wavelength. An optical bandpass filter 128 may be deployed in the fiber ring 101 to select only the desired laser wavelength to circulate in the fiber ring 101 by suppressing light at other wavelengths. An optical power splitter 124, e.g., a fiber coupler, may be used to split a portion of the laser power in the ring 101 to produce an output. Another optical coupler 160 is further used to split the output into a beam 161 as the output and a monitor beam 162 for monitoring the condition of the laser oscillation and the fiber ring 101 in one or more control feedback loops for stabilizing the laser. An optical isolator 120 is used in the fiber ring 101 to ensure a single-directional oscillation in the fiber ring 101 (e.g., the clockwise direction as shown).

A mode-locked laser generally produces multiple longitudinal modes that oscillate simultaneously. A mode-locking mechanism is implemented in the resonator to synchronize the phases of different modes in such a way that the phase difference between any two adjacent modes is a constant. These phase-locked modes constructively add to one another to produce a short pulse. In the laser 100, an optical modulator 126 is coupled in the fiber ring 101 to modulate the light in the fiber ring 101 under a control by a modulator control signal 194 at a modulation frequency. One exemplary implementation of such a modulator is an electro-optic modulator based on the electro-optic effect. A $LiNbO_3$ crystal or other electro-optic material may be used. A Mach-Zehnder configuration is often used in many commercial optical modulators. Alternatively, an acousto-optic modulator may also be used as the modulator 126.

A modulator driver 190, such as a RF signal generator or synthesizer, is used to produce the modulator control signal 194 to drive the optical modulator 126. The control signal 194 may be a RF signal at a desired frequency, e.g. tens of GHz, such as 10 GHz or 40 GHz.

The optical dispersion in the fiber ring 101 may be reduced to a desirable small amount by design, e.g., using low-dispersion optical materials. When the dispersion of the fiber ring 101 is unacceptable, a dispersion compensating fiber segment 112 may be included in the fiber ring 101 to produce an optical dispersion that negates the optical dispersion in the fiber ring 101 caused by other fibers and the fiber gain segment 110. This dispersion compensating fiber segment 112 may be configured to operate in two different modes. In the first mode, the fiber 112 is designed to reduce or minimize the overall dispersion in the fiber ring 101 and hence to shorten the pulse width. In the second mode, the fiber 112 is designed to provide a condition where the self-phase modulation and the group velocity dispersion are balanced to produce optical solutions rather than regular optical pulses.

Notably, the fiber segments 110 and 112 may be designed to constitute the majority of the optical path length of the fiber ring 101, e.g., greater than about 80%. Hence, any variations in the physical lengths of the fiber segments 110 and 112 dominate over variations in other fiber segments (less than 3 to 10%) in the fiber ring 101. To reduce the power consumption in thermally stabilizing the fiber ring 101, a thermally controlled chamber or housing 150 may be used to enclose only the fiber segments 110 and 112 while leaving other fiber segments and optical components outside the chamber 150. A temperature control unit 152 is thermally coupled to the chamber 150 to actively control the temperature of the fiber segments 110 and 112 in response to a control signal 151. One or more temperature sensors 154A are distributed in the chamber 150 to measure the temperature therein. In particular, locations of multiple temperature sensors 154A may be strategically selected within the chamber 150 to more accurately measure the average temperature of the enclosed fiber segments 110 and 112. The sensor signals 156A are then fed to a laser control unit 180 that generates the control signal 151 based on the signals 156A. This forms one active control loop in the laser 100. Additional temperature sensors 150B may also be placed in other parts of the fiber ring 101 outside the thermally-controlled chamber 150. The sensor signals 156B indicating local temperatures at the sensor locations are also fed to the laser control unit 180.

The laser 100 also has a fiber stretcher 140 coupled to the fiber segment 112 to control its physical length and hence the overall optical path length of the fiber ring 101. The fiber stretcher 140 operates to apply a force 142 to change the length of the fiber segment 112 at a speed higher than that the thermal control chamber 150 to provide the fast control. A control signal 141 generated from the laser control unit 180 is used to control the operation of the fiber stretcher 140. This forms the second control loop of the laser 100 and operates as the fast control mechanism. In one implementation, a piezo-electric transducer may be used as the fiber stretcher. The fiber stretcher 140 is generally enclosed in the chamber 150. The fiber stretcher 140 may also be coupled to control the physical length of the gain fiber 110. Both fiber segments 110 and 112 may be actively controlled by fiber stretchers as the fast control mechanism.

The performance of the laser 100 is monitored by using an optical detector 170 to convert the optical signal 162 into an electronic signal 172. This optical-to-electronic interface provides a common feedback for control loops for the thermal control associated with chamber 150 that encloses the fiber segments 110 and 112 and for the fast length control over the fiber 112 by the fiber stretcher 140. The laser control unit 180 processes this monitor signal 172 to produce the fast control signal 141.

Figure 2:
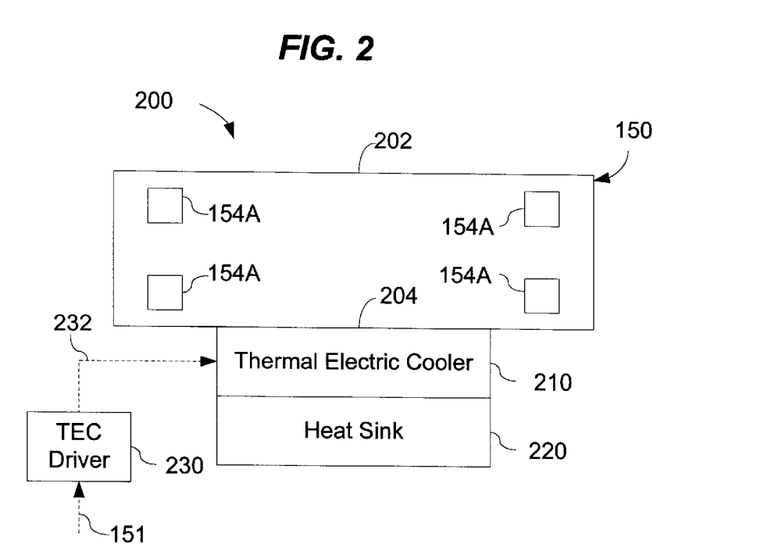
FIG. 2 shows one embodiment of the thermally-controlled chamber in FIG. 1.

FIG. 2 shows one implementation 200 of the active thermal control of the fiber segments 110 and 112 in FIG. 1. A thermal electric cooler 210 is used as the temperature unit 152 in FIG. 1. The thermal electric cooler 210 has one side in thermal contact with a surface 204 of the chamber 150 and another side in thermal contact with a heat sink 220. A TEC driver 230 is electrically coupled between the laser control unit 180 and the TEC 210 to convert the control signal 151 into the driver signal 232 that generally is a driving current.

The surface 204 of the chamber 150 may be formed of a material with a low heat resistance to promote thermal conductivity between the chamber 150 and the TEC 210. The other surfaces 202 of the chamber may be formed of a thermal insulating material to thermally isolate the chamber interior from the environment.

Figure 3:
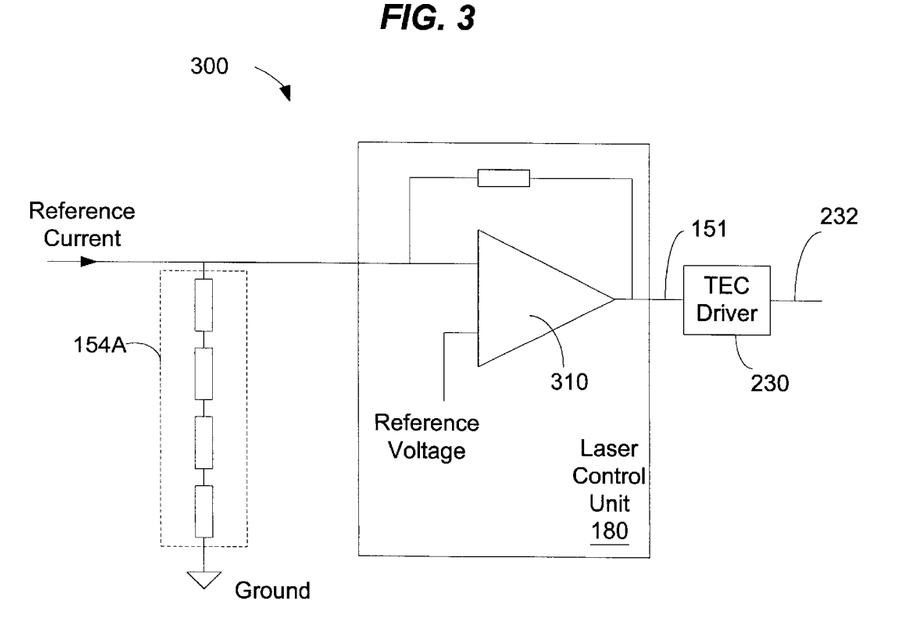
FIG. 3 shows an analog implementation of a laser control unit in FIG. 1 that produces a temperature control signal.

FIG. 3 shows a part of the laser control unit 180 that converts the sensor signals 156A into the control signal 151 when designed as an analog circuit. In this design, the temperature sensors 154A are assumed to be thermal resistors that are connected in series electrically. An inverted op-amp 310 is used to compare the signals 156A with a reference voltage. If the measured temperature of the chamber 150 is less than a desired temperature, the difference between the voltage drop across the thermal resistors 154A and the reference voltage produces a signal 151 that operates the TEC 210 to heat up the chamber 150. If the measured temperature is higher than the desired temperature, the TEC 210 reduces heating or operates in cooling mode to reduce the chamber temperature.

Figure 4:
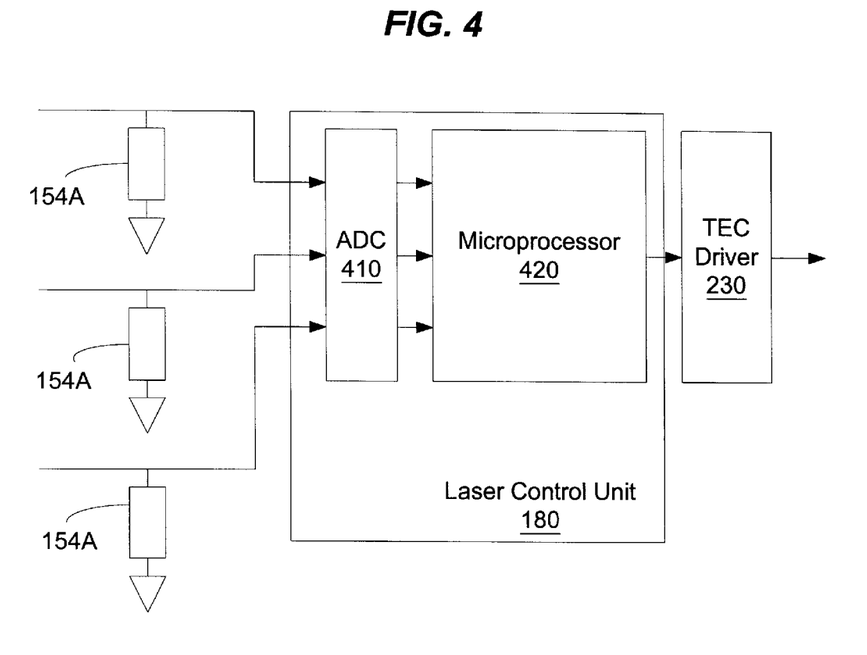
FIG. 4 shows a digital implementation of a laser control unit in FIG. 1 that produces a temperature control signal.

FIG. 4 shows a part of the laser control unit 180 that converts the sensor signals 156A into the control signal 151 when designed as a digital circuit. Signals 156A from different temperature sensors 154A are separated fed into the laser control unit 180. An analog-to-digital converter 410 is used to convert the analog sensor signals 156A into digital signals. A microprocessor 420 receives and process the digital sensor signals to control the TEC driver 230. This digital design based on the microprocessor 420 provides flexibility and convenience in signal processing that are difficult to implement in the analog design. For example, different signals 156A may be averaged with different weights according to the sensor locations in the chamber 150 to produce an averaged temperature of the enclosed portion of the fiber ring 101.

Figure 5A:
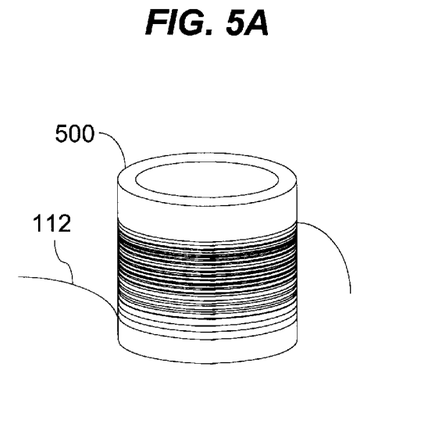
FIGS. 5A and 5B shows a PZT fiber stretcher and the technique for winding the fiber.
Figure 5B:
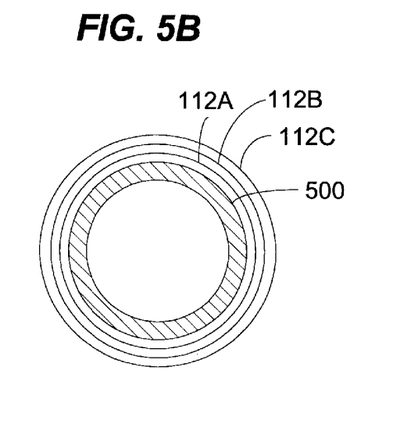

The fiber stretcher 140 in FIG. 1 may be a piezo-electric tube 500 illustrated in FIGS. 5A and 5B. The fiber segment 112 may be wound around the exterior surface of the PZT 500, preferably without hard bending and twisting to reduce the optical loss. FIG. 5B shows the fiber segment 112 may be wound in layers (e.g., 112A, 112B, 112C, etc.) to increase the stretching sensitivity and the total amount of stretching. An adhesive, such as an epoxy, may be applied to the fiber coil. In one implementation, such PZT tube 500 may operate in the range of kilohertz range to compensate for changes caused by most acoustic vibrations.

Figure 6:
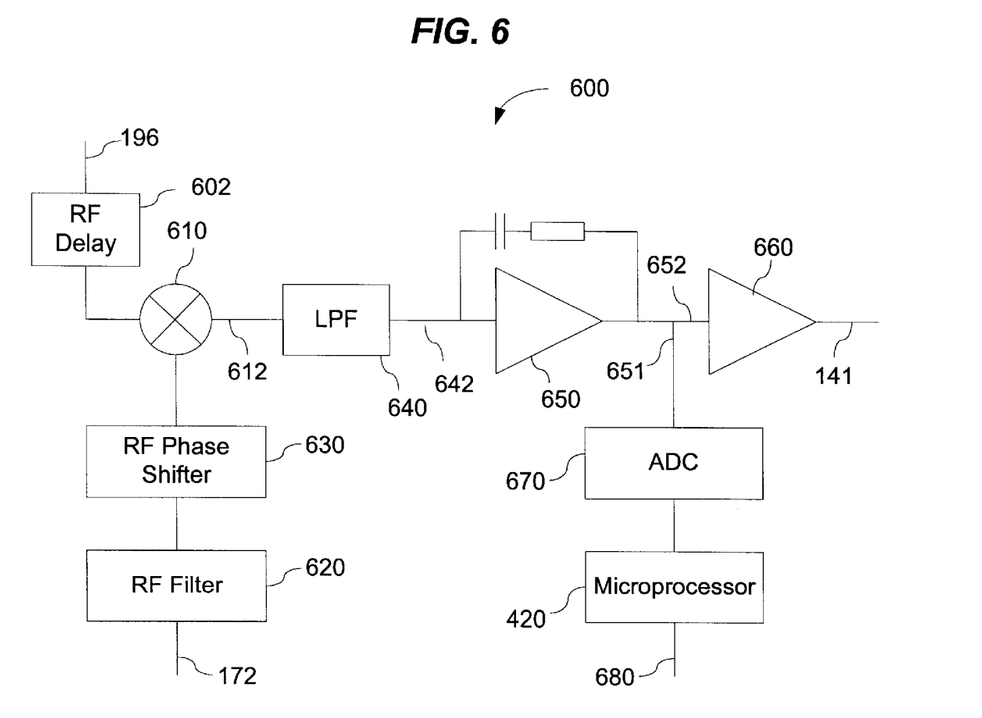
FIG. 6 shows an analog implementation of a part of the laser control unit that produces the control signal for the fiber stretcher.

FIG. 6 shows one implementation 600 of another part of the laser control unit 180 that produces the fast control signal 141 to the fiber stretcher 140. The output signal 192 of the modulator driver 190 is split into the portion 194 for controlling the modulator 126 and a portion 196 for operating the laser control unit 180. The laser control unit 180 processes this portion 196 and the monitor signal 172 from the optical detector 170 to produce the signal 141. This part of the laser control unit 180 a RF filter 620 and a RF phase shifter 630 process the monitor signal 172. An RF delay unit 602 may be optionally connected in the input path of the signal 196. A RF signal mixer 610 is then coupled to the delay unit 602 and the RF phase shifter 630 to mix the signals 196 and 172 and produces a new signal 612. A low-pass RF filter 640 then filters out the high-frequency components of the signal 612 to produce a signal 642 that includes the signal component at the difference frequency between the frequencies of the signals 172 and 196. The signal 642 can be used to indicate the phase relation between the modulation signal 192 and the optical pulses at the laser wavelength in the ring 101. An integrator 650 to produce two signals 651 and 652 with the same information. The signal 652 is amplified by a high-voltage amplifier 660 to produce the driver signal 141 for driving the PZT fiber stretcher 140 to synchronize the total optical path length of the fiber ring 101 with the modulation frequency of the optical modulator 126 so that a multiplicity of the longitudinal mode spacing set by the total optical path length of the fiber ring 101 is substantially equal to the modulation frequency of the signal 194.

This part of the laser control unit 180 also includes an analog-to-digital converter 670 and the microprocessor 420 to process the signal 651 to produce a control signal 680 for controlling the temperature of the chamber 150. The control signal 680 is used to bias the temperature of the chamber 150 so that the total optical path length of the fiber ring 101 is set to a state where the fiber stretcher 140 can adjust the cavity length in both directions within the operating range of the fiber stretcher 140.

Figure 7:
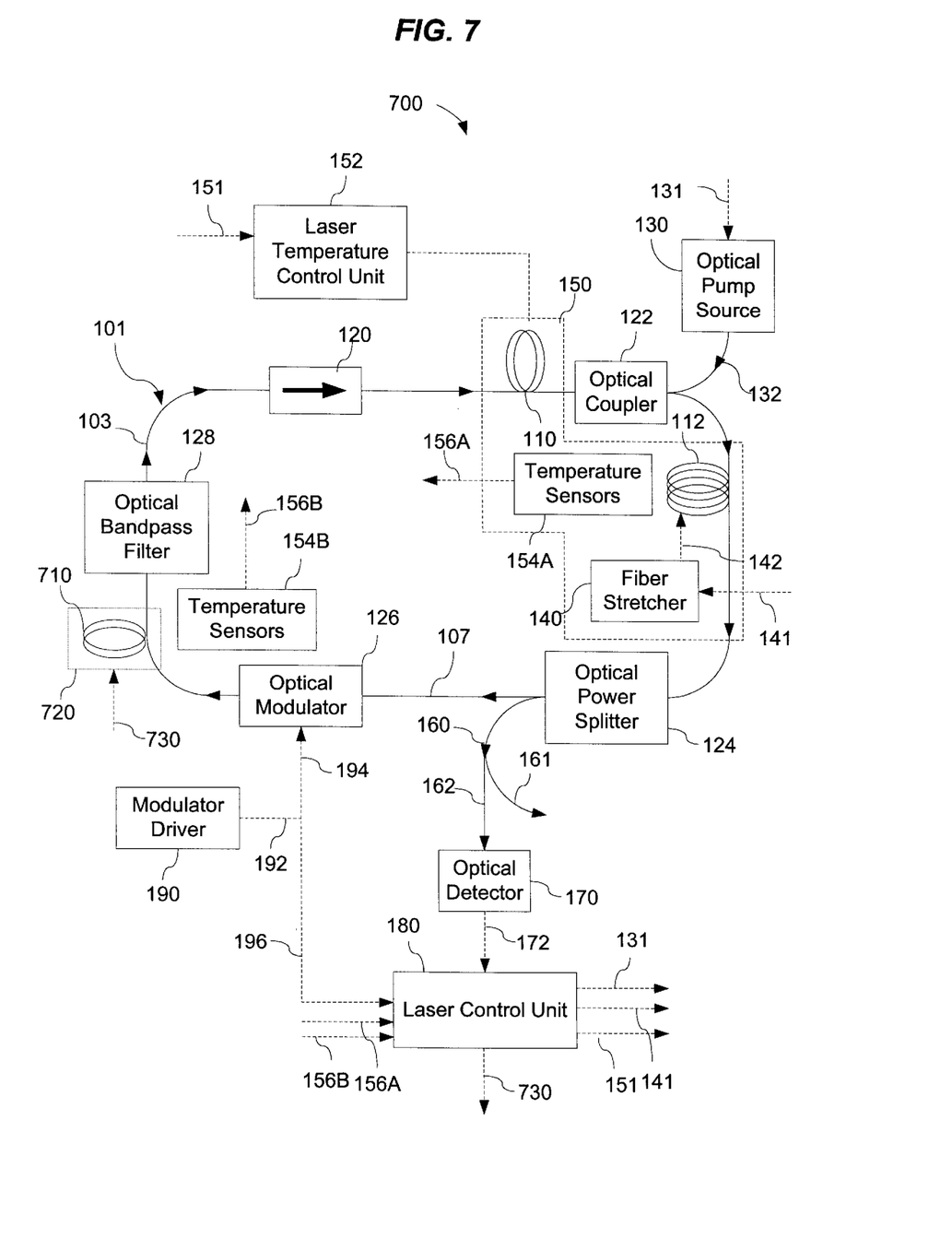
FIG. 7 shows an actively mode-locked fiber ring laser that includes a fast temperature control mechanism according to one embodiment, where solid arrowed lines represent optical paths and dashed arrowed lines represent the non-optical signal paths.

FIG. 7 shows that the laser 100 in FIG. 1 may be modified to add a fast temperature control device 720 over a fiber segment 710 shorter than the fiber segments 110 and 112 and located outside the chamber 150. In one implementation, the fiber segment 710 may be coated with a metallic layer on the exterior surface of the fiber. An electric current source is connected to the fiber exterior to supply a current that heats up the fiber segment 710 according to a control signal 730. In another implementation, a TEC may be used to control the temperature of the fiber segment 710. The thermal response time of this part is faster than the thermal response in the chamber 150 because the fiber segment 710 is shorter and hence has a low heat capacity. In this design, the laser 700 has three active control mechanisms with different ranges of response times. The PZT fiber stretcher 140 operates in the kilohertz range to correct high frequency disturbances such as vibrations. The fast thermal control 720 operates in the sub-hertz range to correct intermediate frequency disturbances. The thermal chamber 150 provides a control over long-term drifts such as variations in the temperature of the surrounding environment.

In the laser 700, the PZT fiber stretcher 140 may be removed if the control device 720 is sufficient to correct the variations that are too fast for the thermal chamber 150. Hence, there is no need for the high-voltage power supply for the PZT stretcher 140. This further reduces the power of the control mechanisms.

Figure 8:
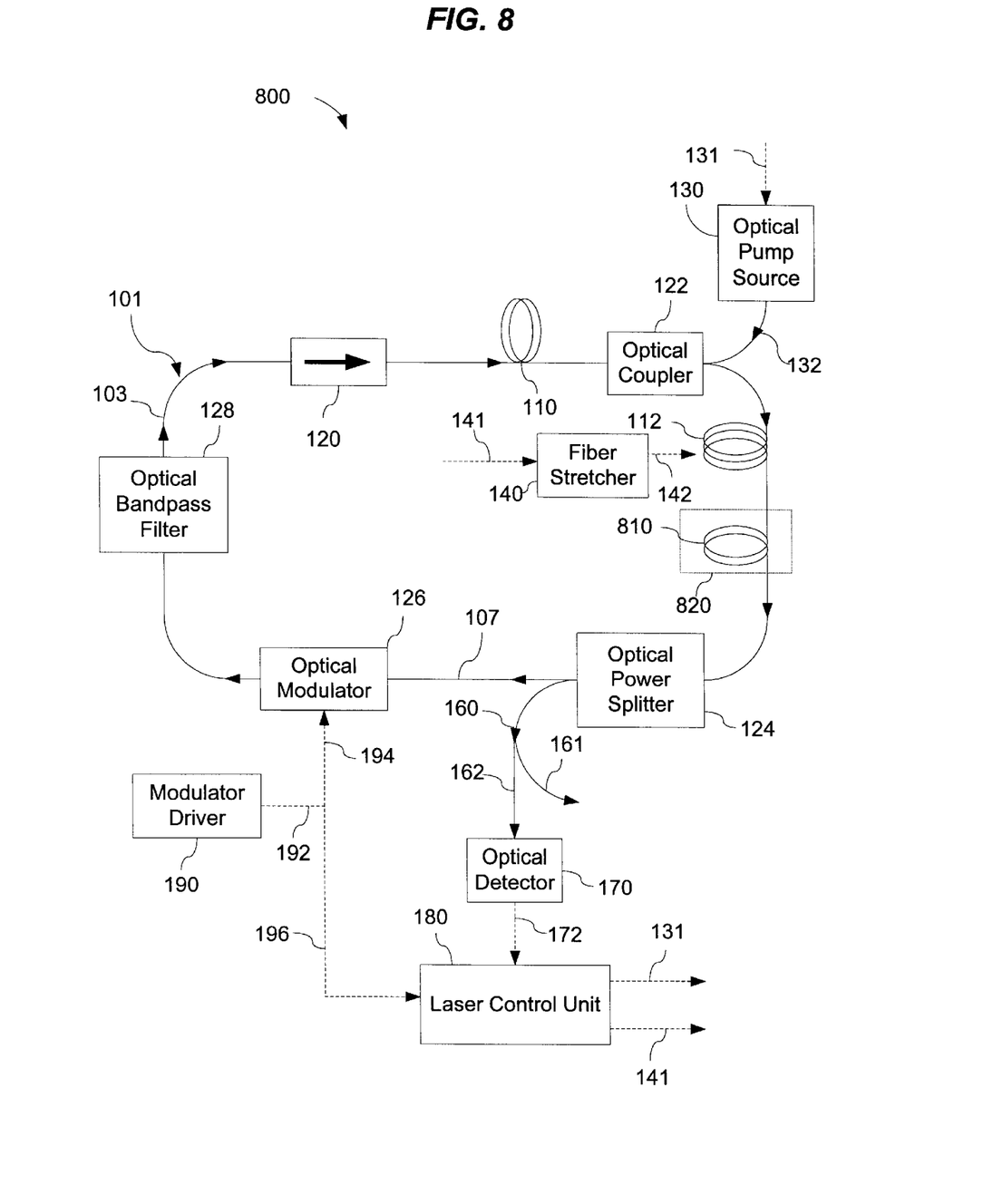
FIG. 8 shows an actively mode-locked fiber ring laser that combines an active control and a passive control according to one embodiment, where solid arrowed lines represent optical paths and dashed arrowed lines represent the non-optical signal paths

In yet another embodiment, the active thermally-controlled chamber 150 may be entirely eliminated to reduce the power consumption. FIG. 8 shows a fiber laser 800 that combines a passive control mechanism 820 with the active control by the fiber stretcher 140. A fiber segment 810, which may be anywhere in the fiber ring that is not controlled by the fiber stretcher 140, is engaged to the passive control 820 that operates to negate the thermal effect without using a power supply.

Figure 9:
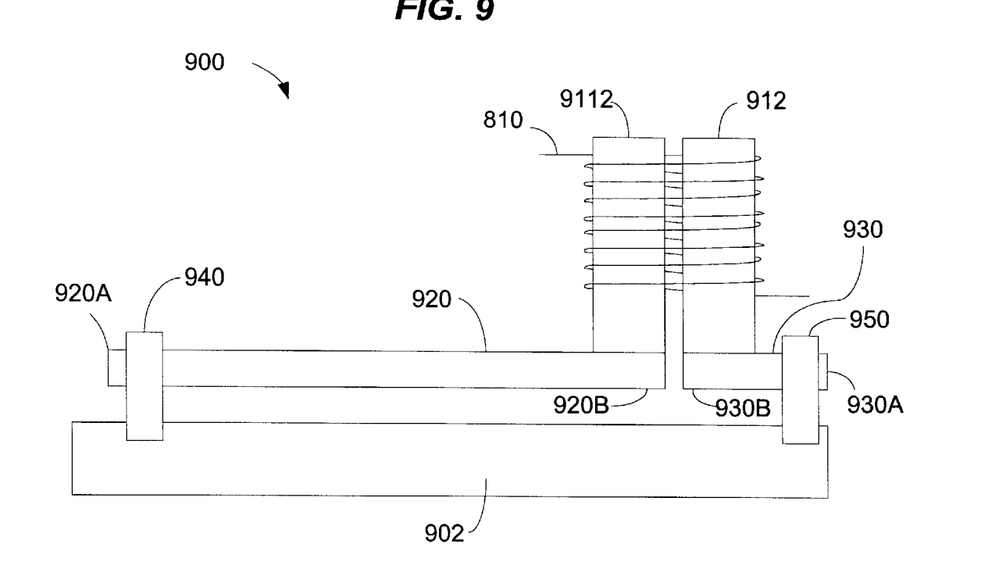
FIG. 9 shows one implementation of the passive control in the fiber laser in FIG. 8.

FIG. 9 shows one embodiment 900 of the passive control mechanism 820. The passive control unit 900 includes two separate fiber holding parts 911 and 912 around which the fiber segment 810 is wound. A base 902 with a low coefficient of thermal expansion is provided. The alloy SuperInvar™, for example, may be used to form the base 902. Two separate beams 920 and 930 of different lengths, formed of a material with a coefficient of thermal expansion higher than that of the base 902, are engaged to two different locations 940 and 950 of the base 902 at their ends 920A and 930A, respectively. The opposite ends 920B and 930B of the beams 920 and 930 are engaged to the fiber holding parts 911 and 912, respectively. In the configuration as shown, when the temperature rises, the beams ends 920B and 930B expands and move toward each other. This motion reduces the stress on the fiber segment 810 and hence reduces the physical length of the fiber segment 810. When temperature decreases, the fiber holding parts 911 and 912 moves away from each other and hence increases the stress and the fiber length. Therefore, this device provides a passive compensation mechanism and reduces the amount of the compensation to be performed by the PZT fiber stretcher 140.

Figure 10:
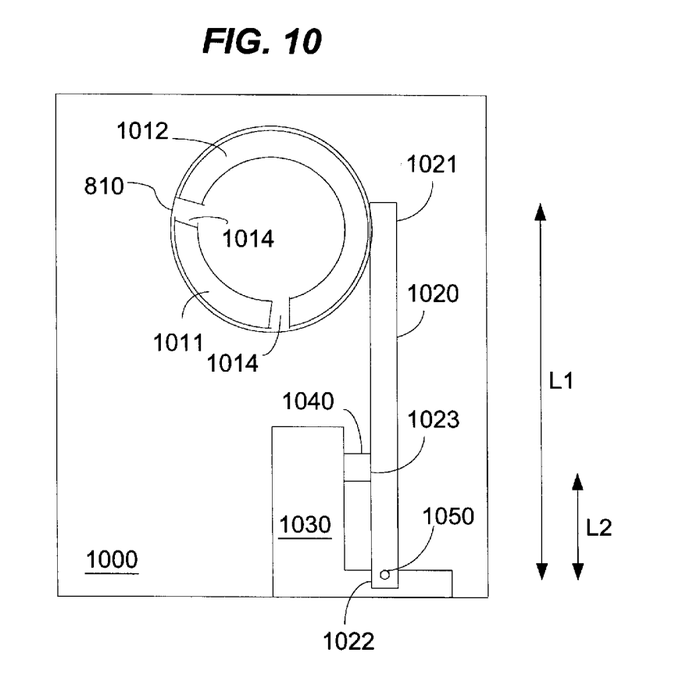
FIG. 10 shows one technique for amplifying a displacement of a PZT element in a fiber stretcher based on a mechanical amplification arm.

The operating range of the PZT fiber stretcher 140 may be limited by the maximum displacement of the PZT element. One way to overcome this is to use a mechanical amplification arm to amplify the displacement of the PZT element. FIG. 10 illustrates one embodiment of this mechanical amplification technique. The fiber stretcher 140 may includes two parts 1011 and 1012 formed from a cylindrical tube that are separated by gaps 1014. The part 1011 is fixed to a platform 1000 and the part 1012 is movable relative to the part 1011. A member 1030 is fixed to the platform 1000 and holds one end of a PZT element 1040. A mechanical arm 1020 has one end 1021 engaged to the part 1012 of the fiber stretcher 140 and another end 1022 engaged to a pivotal point 1050 on the member 1030. The PZT element 1021 is in contact with a selected location 1023 between the two ends of the arm 1020. Hence, a displacement of the PZT 1040 produces a displacement of the end 1021 of the arm 1020 by a factor of L1/L2.

Figure 11:
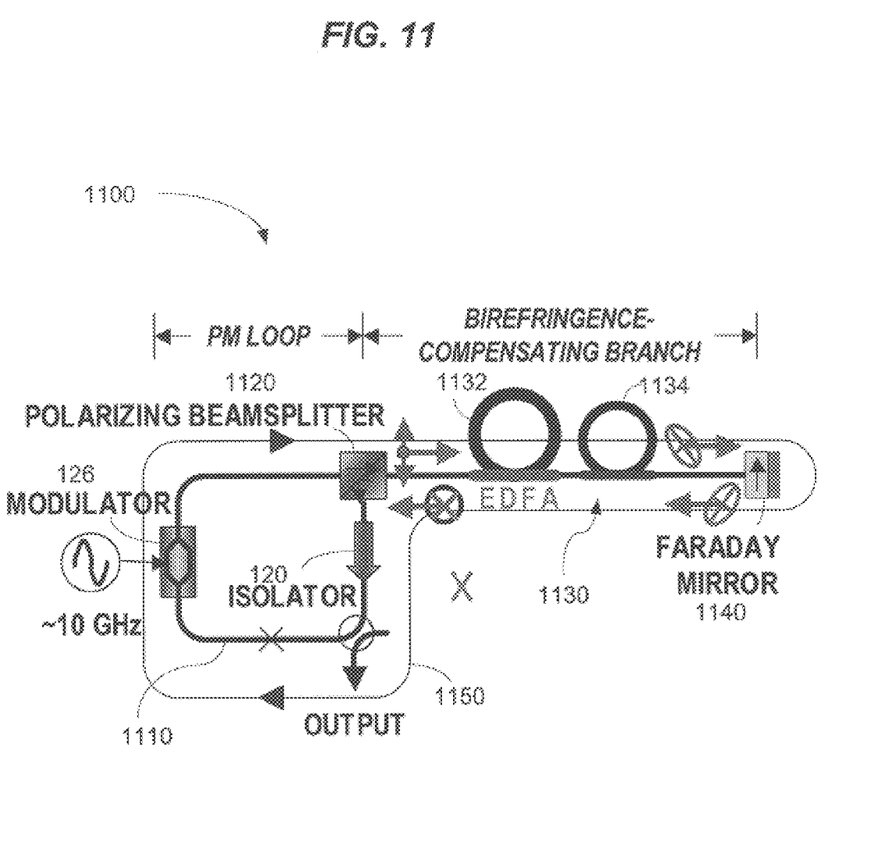
FIG. 11 shows a polarization-stable mode-locked fiber laser.

The above control mechanisms may be used in a polarization-stable fiber mode-locked laser 1100 shown in FIG. 11. See, U.S. Pat. No. 5,574,739. The laser cavity includes a first fiber part 1110 formed of a single-mode PM fiber and a second fiber part 1130 formed of a single-mode fiber. The first fiber part 1110 includes the modulator 126, the optical isolator 120, and the output coupler 124. Two terminals of the fiber part 1110 are coupled to two facets of a polarizing beam splitter 1120 which is coupled to one end of the second fiber part 1130. The other end of the fiber 1130 is terminated at a Faraday rotator mirror which reflects light with a 90-degree rotation in polarization. A portion 1132 of the second fiber part 1130 may be doped as the optical gain medium. The line 1150 represents the direction of the light in the optical cavity: light starts from the gain section 1132 to be reflected by the reflector 1140 and is amplified again before reaching the beam splitter 1120. Light in one polarization is selected to be reflected into the first fiber part 1110 by the beam splitter 1120 and is fed back to the gain section 1132 after being modulated by the modulator 126 and passing through the beam splitter 1120. Light in the other polarization is suppressed. The second fiber part 1130 may also include a dispersion compensating fiber segment 1134 similar to the segment 112 in FIG. 1. As in FIG. 1, the thermal control chamber 150 may be used to enclose only the second fiber part 1130 to reduce the power consumption. The fiber stretcher 140 may be placed in either of the fiber parts 1110 and 1130. Other control mechanisms, including the fast temperature control 720 in FIG. 7 and the passive control in FIGS. 8 and 9 may also be used in the laser 1100.

An active mode-locked laser based on the above control mechanisms may produce laser pulses whose pulse repetition rate is in synchronization with a master clock. If the period of the master clock changes, the pulse repetition rate needs to change accordingly. This may also be achieved by using the active control mechanism, e.g., the fiber stretcher 140 in laser 100 in FIG. 1, to adjust the total optical path length of the laser cavity. Hence, the active control can be used for both stabilizing the laser against disturbances to produce a substantially constant pulse repetition rate and synchronizing the laser to the master clock.

Only a few embodiments are disclosed. However, it is understood that variations and enhancements may be made without departing from the spirit of and are intended to be encompassed by the following claims.

What is claimed is:

1. A device, comprising:
    an optical cavity formed of a fiber ring that has a first fiber portion and a second fiber portion;
    a chamber enclosing only said first fiber portion;
    a temperature sensor located in said chamber to measure a temperature;
    a temperature control unit coupled to said chamber and operable to maintain said chamber at a chamber temperature against variations in said measured temperature;
    an optical coupler coupled in said fiber ring to extract an output optical signal; and
    a fiber stretcher coupled to a location in said fiber ring and operable to adjust a physical length of said fiber ring according to information in said output optical signal.

2. The device as in claim 1, further comprising a passive control element coupled to said second fiber portion and operable to adjust said second fiber portion to negate an effect of thermal expansion without receiving power from a power supply.

3. The device as in claim 2, wherein said passive control element includes two different materials with different thermal expansion coefficients.

4. The device as in claim 1, wherein said fiber stretcher includes a piezo-electric element.

5. The device as in claim 4, wherein said fiber stretcher includes a mechanical arm engaged to said piezo-electric element to amplify a displacement of said piezo-electric element in controlling said physical length.

6. The device as in claim 1, further including a microprocessor that controls said temperature control unit.

7. A device, comprising:
    an optical cavity having a first cavity portion and a second cavity portion;
    a chamber enclosing only said first cavity portion;
    a temperature sensor located in said chamber to measure a temperature;
    a first temperature control unit coupled to said chamber and operable to maintain said chamber at a chamber temperature against variations in said measured temperature; and
    a second thermal control unit coupled to said second cavity portion and operable to adjust a temperature of said second cavity portion according to information in an output optical signal from said optical cavity, wherein said second thermal control unit is designed to have a response time faster than a response time of said first temperature control unit.

8. The device as in claim 7, wherein said first temperature control unit includes a thermal electric device.

9. A device, comprising:
    an optical cavity formed of a fiber ring which includes a doped fiber segment and a dispersion compensation fiber segment, said doped fiber segment responsive to optical pumping by light at a pump wavelength to produce an optical gain at a laser wavelength different from said pump wavelength, said dispersion compensation fiber segment operable to produce optical dispersion that negates optical dispersion in segments of said fiber ring;
    an optical modulator in said fiber ring to modulate a property of light in said optical cavity at a modulation frequency;
    an optical filter in said fiber ring to pass light at said laser wavelength while rejecting light at other wavelengths;
    an output optical coupler in said fiber ring to extract a portion of light at said laser wavelength in said fiber ring as an optical output;
    a thermal control chamber enclosing only said doped fiber segment and said dispersion compensation fiber segment without said optical modulator, said optical filter, said output optical coupler, and other portions of said fiber ring;
    a thermal control unit in thermal contact with said thermal control chamber and operable to maintain said chamber at a chamber temperature; and
    a fiber control element engaged in said fiber ring and operable to change a physical length of said fiber ring to stabilize said optical cavity according to information in said optical output.

10. The device as in claim 9, wherein said fiber control element includes a piezo electric tube transducer around which a fiber segment of said fiber ring is wound with a plurality of fiber layers.

11. The device as in claim 9, further comprising a microprocessor coupled to receive information on an actual temperature in said chamber and said information in said optical output and operable to produce a temperature control signal that controls said thermal control unit and a fiber control signal that controls said fiber control element.

12. The device as in claim 9, further comprising a passive control element coupled to a portion of said fiber ring and operable to adjust said portion to negate an effect of thermal expansion without receiving power from a power supply.

13. The device as in claim 12, wherein said passive control element includes two different materials with different thermal expansion coefficients.

14. A method, comprising:
    enclosing only a first cavity portion of a laser cavity in a temperature-controlled chamber to leave a second, remaining cavity portion of the laser cavity outside the temperature-controlled chamber;
    controlling the temperature of the temperature-controlled chamber against a variation from a desired chamber temperature;
    measuring a laser output from the laser cavity to monitor a change in a total length of the laser cavity;
    using a cavity control unit engaged to at least one of the first and the second cavity portions to dynamically adjusting a cavity length of the laser cavity to negate the change in the total length of the laser cavity; and
    engaging an optical modulator in the laser cavity to produce an optical modulation in response to a modulation driver signal; and
    using a microprocessor to control the temperature-controlled chamber and the cavity control unit according to the modulation driver signal, a temperature of the laser cavity, and information in the laser output.

15. The method as in claim 14, further comprising engaging a passive thermal control element in the second cavity portion of the laser cavity to negate a change in the laser cavity caused by a temperature variation in the second cavity portion.

16. The method as in claim 14, wherein the laser cavity is a fiber laser cavity, and the cavity control unit is a fiber stretcher engaged to a fiber segment in the first cavity portion within the temperature-controlled chamber.

* * * * *